UNITED STATES PATENT OFFICE.

CHARLES L. MOHR, OF JANESVILLE, WISCONSIN, ASSIGNOR TO MOHR MANUFACTURING COMPANY, OF CHICAGO, ILLINOIS, A CORPORATION OF MICHIGAN.

ATTACHMENT FOR LINOTYPE-MACHINES.

1,036,678.      Specification of Letters Patent.      Patented Aug. 27, 1912.

Application filed October 18, 1911. Serial No. 655,373.

*To all whom it may concern:*

Be it known that I, CHARLES L. MOHR, a citizen of the United States, residing at Janesville, county of Rock, and State of Wisconsin, have invented new and useful Improvements in Attachments for Linotype-Machines, of which the following is a specification.

My invention relates to improvements in attachments for linotype machines.

The object of my invention is to provide a device for cutting off or trimming one end of the linotype slugs or so called linotypes, as they pass from the machine in which they are made, to the composing stick, whereby any desired number of said linotype slugs when finished, will be exact in shape and of the required uniform lengths.

My invention pertains more especially, among other things: 1st, to the application of a rapidly revolving saw for cutting off or trimming the ends of the linotype slugs; 2nd, to the device for pushing the linotype slugs forwardly in contact with the saw as they are being cut or trimmed. 3rd, to the device for adjustably supporting the saw and its supporting shaft at different elevations as may be required to trim or cut linotype slugs of the same or different lengths, whereby all of said linotype slugs may be made of the same length. 4th, to the device for slidably supporting the driving shaft within a non adjustable driving pulley and fly wheel, whereby said shaft and the saw supported thereon, may be raised or lowered to conform to different lengths of linotype slugs without raising or lowering such pulley or fly wheel, and whereby the saw supporting shaft is relieved of the weight of such pulley and fly wheel. 5th, to the device for adjustably supporting the upper end of the saw supporting shaft as may be required to retain the saw in its proper relative position to the base upon which the linotype slugs are supported, while being trimmed or cut; and 6th, to the inclinable chute through which the linotype slugs are caused to pass of their own gravity from the trimming saw to the composing stick.

My invention is further explained by reference to the accompanying drawings, in which—

Figure 1:
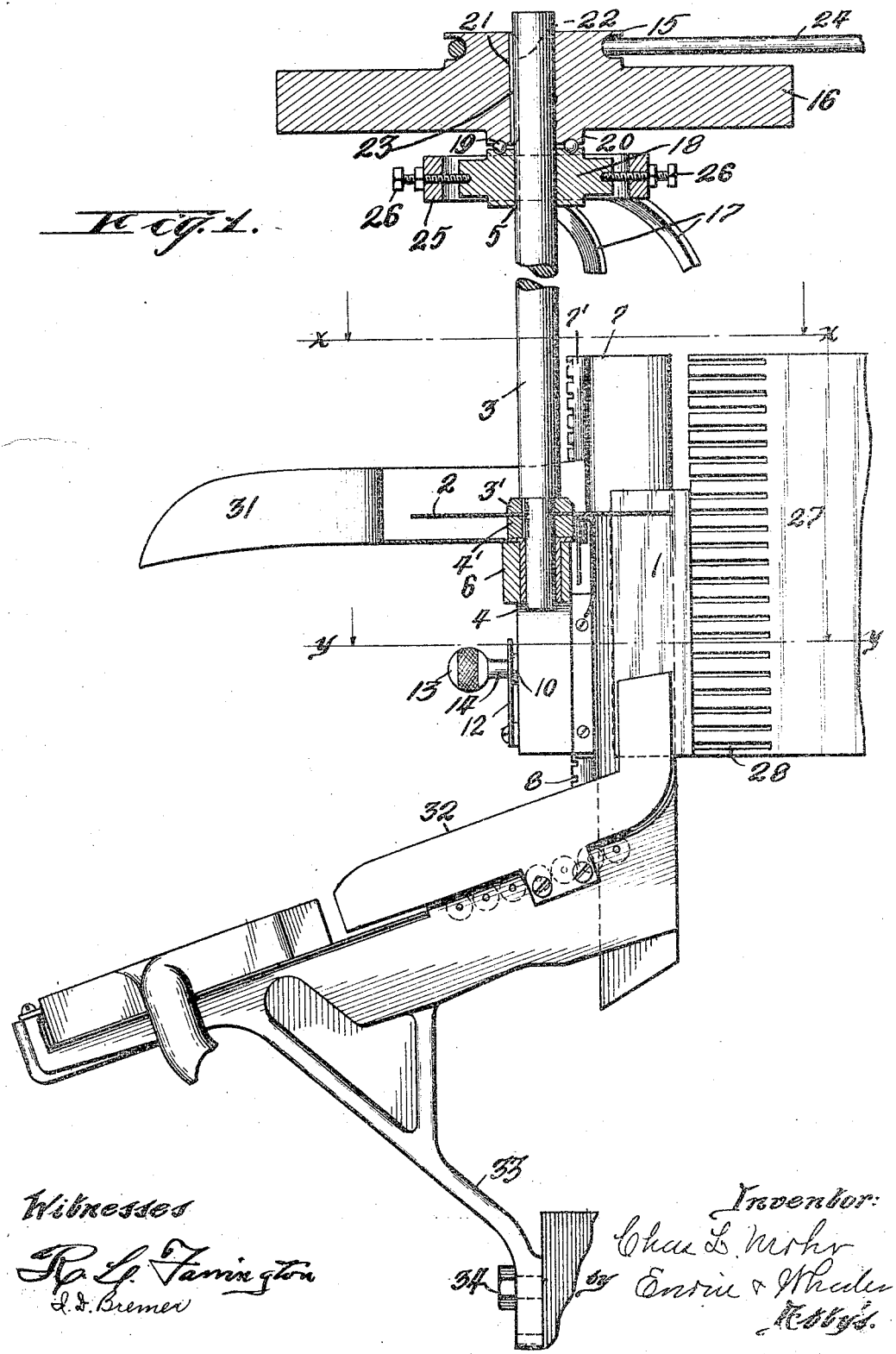
Figure 2:
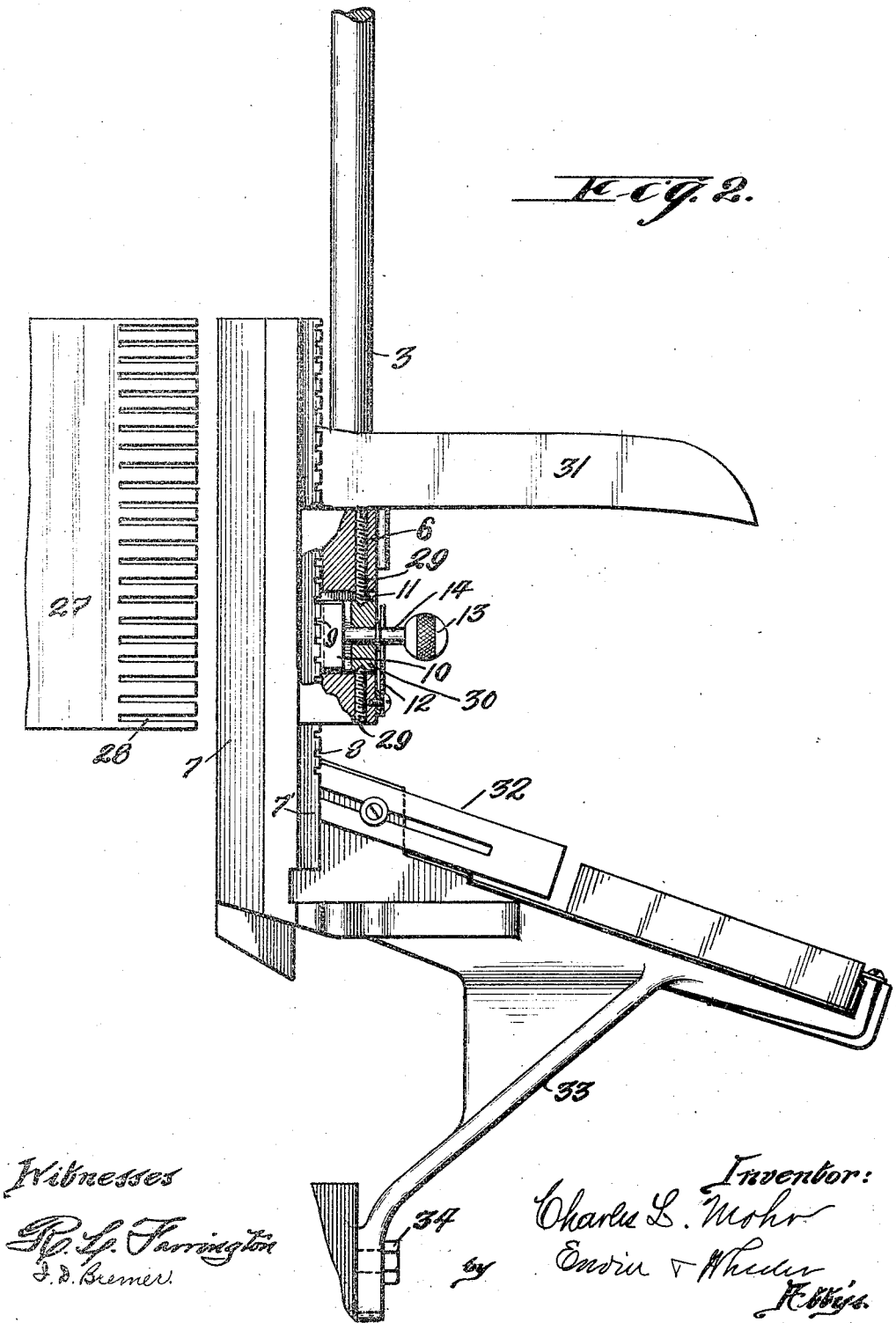
Figure 3:
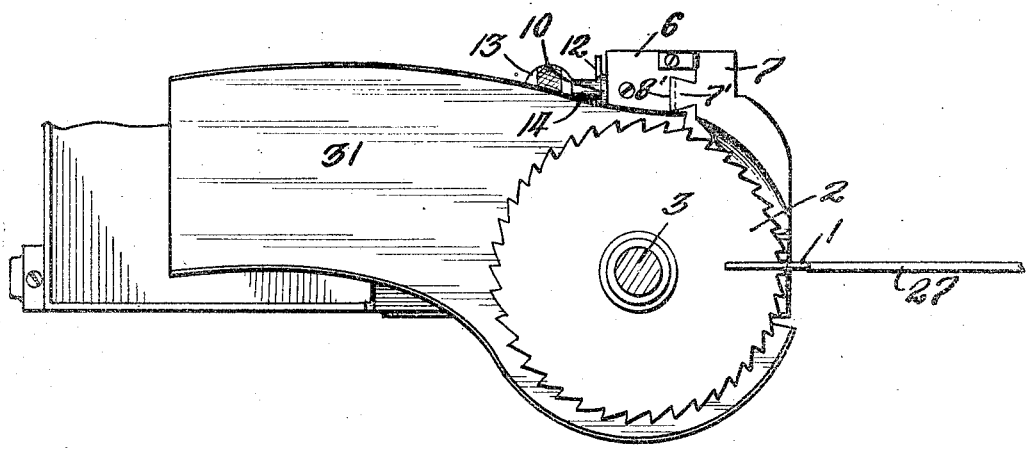
Figure 4:
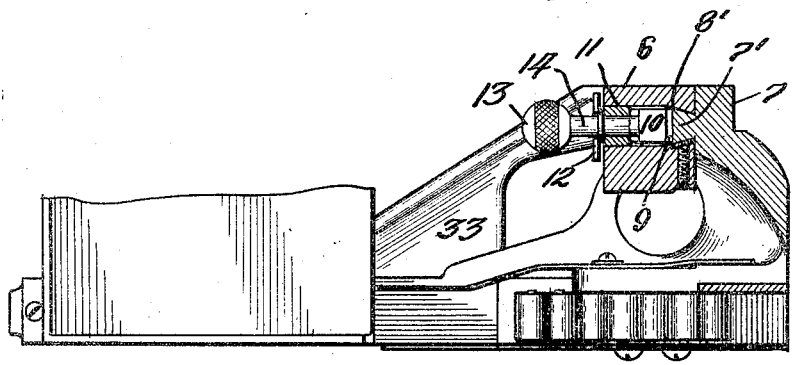

Figure 1 is a side view thereof. Fig. 2 is a view of the opposite side from that shown in Fig. 1. Fig. 3 is a sectional view, drawn on line *x—x* of Fig. 1; and Fig. 4 is a sectional view, drawn on line *y—y* of Fig. 1.

Like parts are identified by the same reference numerals throughout the several views.

1 represents one of the linotype slugs, as it is being pushed forwardly against the saw in the act of trimming or cutting off a portion of its upper end.

2 is a circular saw by which the linotype slug 1 is cut. The saw 2 is rigidly secured to the shaft 3 by the clamping nuts 3' and 4' in the ordinary manner. The shaft 3 is supported at its lower end in the journal bearing 4 and at its upper end in the journal bearing 5. The lower journal bearing 4 is formed in the bracket 6, and said bracket is adjustably supported from the stationary standard 7 by the dove-tailed tongue 7' operating in a closely fitting dove-tailed groove 8' formed in said bracket. The standard 7 is provided with a series of transverse notches 8 for the reception of the teeth 9 of the supporting member 10. The supporting member 10 is slidably supported in the transverse recess 11 of the bracket 6, and is retained in yielding contact with the standard 7 by the spring 12.

When desirous to raise or lower the saw to conform to linotype slugs of different lengths, the member 10 is drawn back until the teeth 9 are brought out of engagement with the recesses 8, when said bracket, together with the shaft 3 and parts supported thereon, are raised or lowered, until brought to the desired point of adjustment; said member 10 is released after it is thrown forwardly by the recoil of said spring 12, whereby the teeth 9 are caused to again engage in the horizontal recesses 8 registering therewith. The member 10 is provided with an operating knob 13, which knob is connected therewith, by the shank 14. The upper end of the shaft 3 is slidably connected with the groove pulley 15 and fly wheel 16, and said pulley and fly wheel are supported from the stationary bracket 17 upon the annular collar 18.

An annular series of ball bearings 19 is interposed between the hub 20 of the fly wheel and the annular collar 18, whereby the friction between the opposing hub and collar is reduced to the minimum. It will be understood that in view of the fact that said pulley and fly wheel are slidably supported upon the shaft 3, the weight of such parts is not carried by the shaft, but instead rests upon said annular series of ball bearings, which ball bearings in turn rest upon the stationary collar 18. The pulley 15 and fly wheel 16 are provided with a vertical groove 21, while the shaft 3 is also provided with a groove 22 registering with the groove in said fly wheel and pulley, said groove being formed for the reception of the key 23. Thus it will be obvious that the revoluble movement communicated to the pulley 15 through the belt 24 will be transmitted to the shaft 3 through said key, whereby the pulley 15, integrally formed fly wheel 16 and shaft 3 are caused to revolve together, while said shaft 3 is free to be moved upwardly and downwardly through said pulley and fly wheel without communicating a vertical movement to such parts. The collar 18 is adjustably supported from the upper end of the bracket 7 within the inclosing collar 25, and said parts 18 and 25 are connected together by the pivotal bolts 26, said pivotal bolts 26 being rigidly connected with the collar 25, while they are pivotally connected at their inner ends with said collar 18. By this arrangement, it will be understood that the upper end of the shaft 3 may be inclined toward the right or left, (reference being had to Fig. 1), by the adjustment of said screws 26; that by adjusting both of said screws toward the right, the upper end of said shaft will be inclined toward the right, while a reverse adjustment of said screws will incline the upper end of said shaft in the opposite direction. The upper end of the shaft is thus made slightly adjustable to facilitate in retaining the saw 2 in its proper position for trimming or cutting the upper ends of the linotype slugs.

27 is a push plate by which the linotype slugs 1 are adapted to be moved forwardly as their upper ends are being severed by the saw. To prevent the saw from cutting into the opposing edge of the push plate 27, as the linotype slugs are being trimmed, I have provided the opposing surface of said push plate with a series of horizontal recesses 28 formed for the reception of the saw as the push plate is moved forwardly against the linotype slug. The recesses 28 are located at uniform distances apart, corresponding with the different lengths of linotype slugs, whereby when a long linotype slug is being trimmed, the saw with its supporting shaft will be raised, so as to sever or trim the upper end of the long linotype slug, and when a shorter linotype slug is used, said shaft and saw will be lowered to conform to the length of the shorter linotype slug and said saw and supporting shaft are adapted to be adjusted to conform to the horizontal recesses formed in said push plate, whereby the saw is adapted to enter such recess as happens to register therewith when linotype slugs of different length are being severed. While the saw and its supporting shaft are adjusted for long and short linotype slugs, as previously described, by raising and lowering the supporting block 10, and while said supporting block 10 is adapted to be adjusted at slight intervals apart corresponding with the distance between the notches 8 of the supporting standard, a still finer adjustment may be produced by the two vertical screws 29, 29, which vertical screws have threaded bearings in the member 6, while their opposing ends have countersunk bearings in the slidable block 30 by which the slidable member 10 is supported, said member 10 being supported from the slidable block 30, through the shank 14. Thus it will be obvious that after the block 10 has been adjusted in approximately the right relative position to the standard 7, the block 30 may be adjusted at an intermediate point between its inclosing bearings by turning one of said screws 29 inwardly and the other outwardly, whereby the shaft 3 and the saw supported thereon, may be brought to the exact point for the saw to enter one of the grooves 28 and to cut off the upper end of the linotype slugs at the exact point desired.

31 is a trough for the reception of the waste pieces of metal, which are severed from the upper end of the linotype slugs by the saws, as said slugs are being trimmed, the trough being preferably inclined downwardly at such an angle as will cause the refuse matter removed from the linotype slugs to descend of its own gravity.

32 is a trough through which the finished linotype slugs, when cut and trimmed, are led to the composing stick, preparatory to being set up for use.

It will be understood that the linotype machine with which my attachment is used, is of the ordinary construction, and that my attachment is secured thereto by the brackets 17 and 33, and bolts 34.

Having thus described my invention, what I claim as new, and desire to secure by Letters Patent, is—

1. In a device of the described class, the combination with a linotype machine, of a revoluble shaft, a circular saw rigidly secured to said shaft, means for communicating a revoluble movement to said shaft and from said shaft to said saw, means for supporting said shaft and saw at several different points of adjustment to correspond with the lengths of the linotype slug to be cut, means for retaining a linotype slug in moving contact with said saw while being cut and trimmed, and means for conducting a linotype slug when cut and trimmed to a composing stick.

2. In a device of the described class, the combination with a linotype machine, of a revoluble shaft, a circular saw rigidly secured to said shaft, means for communicating a revoluble movement to said shaft and from said shaft to said saw, means for supporting said shaft and saw at different points of adjustment to correspond with the lengths of the linotype slug to be cut, a push plate provided upon one edge with a plurality of horizontal recesses for the reception of the periphery of the saw as it passes through the severed linotype slugs, and means for conducting a linotype slug, when cut and trimmed, to a composing stick.

3. In a device of the described class, the combination with a linotype machine, of a revoluble shaft, means for adjusting and supporting the upper end of said shaft in a true vertical position or at a slight angle to the vertical, a circular saw rigidly secured to said shaft, means for communicating a revoluble movement to said shaft and from said shaft to said saw, means for retaining a linotype slug in moving contact with said saw, while being cut and trimmed, and means for conducting a type slug when cut and trimmed to a composing stick.

4. In a device of the described class, the combination with a linotype machine, of a stationary bracket, a pulley supported on said bracket, a revoluble shaft slidably supported at its upper end in said bracket, a circular saw rigidly affixed to said shaft near its opposite end, means for raising, lowering and supporting said shaft and saw at any desired point of adjustment, means for communicating a revoluble movement to said shaft and from said shaft to said saw, means for retaining a linotype slug in moving contact with said saw while being cut, means for conveying the severed ends of said linotype slugs from the saw, and means for conducting a linotype slug, when cut and trimmed, to a composing stick.

In testimony whereof I affix my signature in the presence of two witnesses.

CHARLES L. MOHR.

Witnesses:
  W. H. DOUGHERTY,
  F. L. CLEMONS.